United States Patent
Collins et al.

(10) Patent No.: US 12,106,087 B2
(45) Date of Patent: Oct. 1, 2024

(54) METHODS AND APPARATUSES SERVICES INTEGRATION MODULE

(71) Applicant: FORD GLOBAL TECHNOLOGIES, LLC, Dearborn, MI (US)

(72) Inventors: Michael Collins, Westland, MI (US); Philip Angelo, Canton, MI (US); Sivakumar Mambakkam, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 17/745,147

(22) Filed: May 16, 2022

(65) Prior Publication Data

US 2023/0367576 A1 Nov. 16, 2023

(51) Int. Cl.
| | |
|---|---|
| G06Q 99/00 | (2006.01) |
| G06F 8/65 | (2018.01) |
| G06F 9/445 | (2018.01) |
| G07C 5/00 | (2006.01) |
| H04L 12/24 | (2006.01) |
| H04L 29/08 | (2006.01) |
| H04W 12/06 | (2021.01) |

(52) U.S. Cl.
CPC .............. *G06F 8/65* (2013.01); *G07C 5/008* (2013.01); *H04W 12/068* (2021.01)

(58) Field of Classification Search
CPC ........ G06F 8/65; H04W 12/068; G07C 5/008; G06Q 10/00; G06Q 30/016; G06Q 30/0601; G06Q 99/00; G06Q 10/0838; G06Q 10/06; G05B 19/418; G08G 1/20
See application file for complete search history.

(56) References Cited

U.S. PATENT DOCUMENTS

| | | | |
|---|---|---|---|
| 10,657,820 B2 | 5/2020 | Mueck et al. | |
| 10,882,521 B2 | 1/2021 | Lepp et al. | |
| 11,024,169 B2 | 6/2021 | Lassoued et al. | |
| 2006/0085203 A1* | 4/2006 | Schweickart | ...... G06Q 10/0838 705/341 |
| 2019/0164113 A1 | 5/2019 | Fosgard | |
| 2022/0266775 A1* | 8/2022 | Mezaael | ............ B60R 16/0231 |

* cited by examiner

*Primary Examiner* — Thuy Dao
(74) *Attorney, Agent, or Firm* — Joseph Zane; Brooks Kushman.P.C.

(57) ABSTRACT

A vehicle includes a reconfigurable software integrated module providing upfitter support capabilities via software residing on the vehicle and designated for individual upfitter modules, the software integrated module working with a vehicle service orchestrator to manage upfitter services in accordance with vehicle resources. The vehicle receives indication of an attached upfit module and determines whether the vehicle includes software for control of the upfit module. The vehicle verifies subscription to the software. Responsive to verification of subscription, the vehicle provides vehicle services to the upfit module as requested by at least one of the software or the upfit module and provides onboard wireless control of the upfit module via a vehicle interface.

18 Claims, 3 Drawing Sheets

METHODS AND APPARATUSES SERVICES INTEGRATION MODULE

TECHNICAL FIELD

The illustrative embodiments generally relate to methods and apparatuses for services integration modules and utilization thereof.

BACKGROUND

Robots are becoming ubiquitous assistants in many aspects of life. In the vehicular world, semi-autonomous and autonomous vehicles perform automatic tasks without the aid of human guidance. Moreover, vehicle upfitting can greatly expand robotic capabilities, and can allow the vehicle to communicate with upfit accessories, which can include, for example, remote (from the vehicle) functionality in the form of transportation and loading accessories, among other things.

Upfitting add-ons with complex feature sets can involve hardwire communication upgrades to a vehicle known as an upfitter integration module (UIM). This provides capability for a variety of upfittings, but is limited at time of installation and can be difficult to upgrade or expand. New upfit options, which may not even exist at the time of UIM installation, may require new or modified UIMs, and this may discourage adoption of new upfit modules in light of the potential hassle of installing a new UIM and ensuring compatibility with the existing upfits as well as the newly desired upfits.

Robotic additions to a vehicle include, but are not limited to, movable decks, lockable bins, robotic delivery assistants, etc. As this technology rapidly expands, users will need to continually upgrade the UIM capability to match the capability of the modules. Continually matching the onboard and upfit technology can create both expense and technological issues.

SUMMARY

In a first illustrative embodiment, a vehicle includes a reconfigurable software integrated module providing upfitter support capabilities and one or more vehicle processors configured to receive control instructions for at least one upfitter module. The processors are also configured to determine whether native vehicle functions are required to supplement action by the upfitter module based on software, executing on the vehicle and designated for use with the upfitter module, indicating vehicle data to be provided to the upfitter module. Further, the processors are configured to utilize any determined native vehicle functions to provide capability to the upfitter module and relay the instructions and results from utilized native vehicle functions to the upfitter module for task completion.

In a second illustrative embodiment, a method for a vehicle comprising a reconfigurable software integrated module providing upfitter support capabilities includes receiving instructions for at least one upfitter module. The method also includes determining whether native vehicle functions are required to supplement action by the upfitter module based on software, executing on the vehicle and designated for use with the upfitter module, indicating vehicle data to be provided to the upfitter module. Further, the method includes utilizing any determined native vehicle functions to provide capability to the upfitter module and relaying the instructions and results from utilized native vehicle functions to the upfitter module for task completion.

In a third illustrative embodiment, a vehicle includes a reconfigurable software integrated module providing upfitter support capabilities via software residing on the vehicle and designated for individual upfitter modules, the software integrated module working with a vehicle service orchestrator to manage upfitter services in accordance with vehicle resources. The vehicle also includes one or more vehicle processors configured to receive indication of an attached upfit module and determine whether the vehicle includes software for control of the upfit module. The one or more processors are configured to verify subscription to the software. Responsive to verification of subscription, the processors are configured to provide vehicle services to the upfit module as requested by at least one of the software or the upfit module and provide onboard wireless control of the upfit module via a vehicle interface.

DETAILED DESCRIPTION

Figure 1:
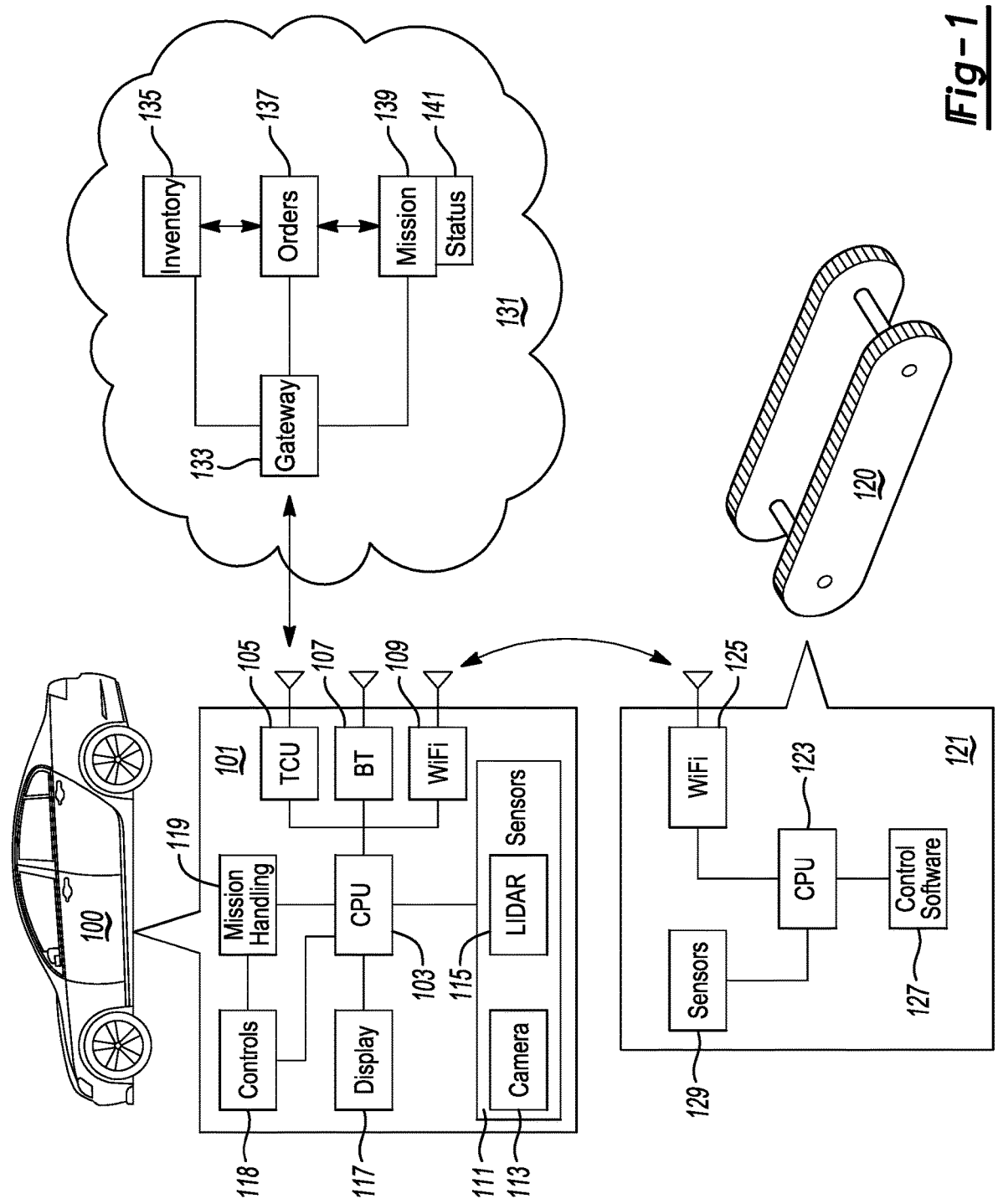
FIG. 1 shows an illustrative vehicle in communication with a cloud and powerloader.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

A services integration module (SIM) is proposed that represents a virtual software suite residing in, for example, the onboard enhanced central gateway (ECG) module, is represented by the illustrative embodiments and the like. As upfit requirements and technology change, this software module can be more easily adapted to meet the changing demands, and ensure consistency of control and communication with upfit units.

This can also allow leveraging of improving vehicle functions by the upfit units through upgrading of the module—for example, a robotic deck may be programmed to move items from a vehicle to a remote location. The deck itself may be relatively unsophisticated in terms of sensing, but the vehicle may have highly complex sensing systems that can be used on behalf of the deck, to guide the deck and control the deck in accordance with sensed surroundings. Effectively imparting some vehicle functionality to the deck in this manner allows for more affordable decks to be built, and if the vehicle sensors need to be included in the vehicle in any event, there are no additional sensors incurred.

Under the UIM scheme, leveraging new vehicle sensors and capabilities may require a new UIM, which will have to be both backwards and forwards compatible and will require knowledge of present vehicular capabilities. That may result in a continual upgrade cycle of expensive hardwired technology that is prohibitive for many users. With an SIM scheme, the software module can be adapted much more cheaply and easily to maintain compatibility and leverage both physical changes (new sensors) and software upgrades to prior sensors, which may render new capabilities to the prior sensors.

In another example, a vehicle for use at multiple sites may include locked bin upfit modules that transport job-specific or client-specific materials and/or protected cargo. Vehicular capabilities may be expanded to, for example, leverage biometrics or device-detection capabilities for access and use of a vehicle. This same technology could be used for bin-access—i.e., a biometric, mobile device, or even location could be used as the basis for unlocking a bin. Using the vehicle as the basis for the unlocking allows the bin to be built without native verification functionality, since the vehicle can act as the approving entity. Further, as vehicular verification functionality progresses, the bin is "automatically" upgraded in security, provided it can still communicate with the vehicle to obtain verification.

By leveraging the often vastly superior computing available in vehicles (relative to the upfits), upfit modules can be provided with enhanced capabilities that progress as the vehicle progresses, and the SIM scheme can ensure continual integration of the capabilities into the upfit modules. The vehicle can also act as a pass-through for verified communication, serving both as a verification entity (ensuring security) and leveraging onboard communication capability in a bi-directional capacity. Then the upfit module itself only need be able to communicate with the vehicle directly, and the vehicle can be assured of translation capability (through SIM maintenance) with whatever command or communication format is utilized by the remote (cloud) systems and the upfit module itself.

For a robotic assistant, such as a powerloader deck, this can include providing remote control capability, and providing feedback to a controller through vehicle sensors. The vehicle itself can also use onboard sensing (e.g., LIDAR, cameras, etc.) on behalf of the powerloader to guide the device autonomously. As vehicle autonomous control strategy (e.g., reaction to obstacles) progresses, so can the control of the powerloader. The SIM module can also be upgraded to ensure that autonomous control provided on behalf of an upfit module is adapted to the constraints or capabilities of the module (powerloader, in this case) instead of the constraints or capabilities of a vehicle. In other instances, the powerloader may be able to react autonomously to input data, and can receive enhanced vehicle LIDAR and other sensor data in order to better self-direct action.

Further, because the vehicle can host a variety of translation capabilities, an API can be used for a variety of upfitters that allows for more uniform programming of upfitter tasks, relying on the vehicle to translate the task for the appropriate upfitter module. Users can also purchase upgrades and service level agreements that manage their current level of upfit use, creating a one-size-fits-all approach that scales in expense and capability as needed by a given user.

FIG. 1 shows an illustrative vehicle in communication with a cloud and powerloader. While not remotely the only possible approach, in this example a powerloader 120 is assisted and controlled through a SIM installed in a passenger vehicle 100. This could, for example, allow for workhorse vehicles such as heavy duty trucks to transport the powerloaders and then have service assist vehicles 100 dispatched to sites to assist the powerloaders in their on-site functioning. The service assist vehicles may have better travel capability and could move from site-to-site with a functioning SIM to assist multiple powerloaders and other upfit modules, while the heavy duty transport trucks may not be suited to such travel and may need to remain on-site in any event to provide source materials to the powerloader.

In such an instance, the truck could include a basic SIM allowing for off-loading assistance, and then a highly sophisticated sensing vehicle 100 with an enhanced SIM could travel around as needed, reducing the need for expensive modules in all of the heavy duty trucks, as well as expensive onboard sensing capabilities. Of course, the alternative approach of providing the SIMs to all the trucks in a fleet is also possible, and still provides the benefit of continual upgradability without hardwired retrofitting. Further, because the SIM capabilities may be largely governed by a service level agreement (SLA), any given truck or assistance vehicle could be upgraded, downgraded or decommissioned on the fly—which could, for example, allow for spot-upgrades of a truck if the assist vehicle was otherwise occupied or could not make it to a site in a timely manner. While this may prevent usage of advanced sensing in the assistance vehicle (again, in this example only), truck sensors that did exist could be leveraged and remote control capability, for example, could be provided through the truck, as well as verification services and other remote functionality. Such an approach allows for a "pay as you use it" strategy that can encourage adaptation of SIM schemes and upfitter modules because expenses can be constrained and incurred as necessary.

The vehicle 100 (which can be any vehicle), includes an onboard computing system 101 with one or more processors 103 and communication transceivers. The transceivers can include, but are not limited to, a telematic control unit with a cellular modem 105, BLUETOOTH communication 107, Wi-Fi communication 109, etc. These communication formats can be used for long range (cloud) communication and/or local communication with the powerloader 120 or other upfitter device.

The vehicle 100 may also include a sensor suite 111, which can include, but is not limited to, cameras 113, LIDAR 115 and any other sensors included to generally assist the vehicle 100 and/or for the express purpose of upfitter assistance. As vehicles 100 obtain more autonomy, sensing capability is expected to increase significantly and the SIM approach will allow leveraging of those sensors by older model upfits.

The vehicle 100 may also include a display, which can include capability to provide oversight or control of an upfitter module, and can be dynamically adapted to provide appropriate display and control sets for a given active upfit. That is, a vehicle 100 could approach a site and be provided with control over a job-bin container, which may show container contents and allow for unlock capability of the bins that include tools for the job and materials for the job or the day's tasks. Once completed, the vehicle display may shift to sensor and control display for the powerloader, or the vehicle may revert to a communications passthrough for the powerloader, allowing for remote control.

The vehicle can include a service layer that provides smart servicing for external devices. Services can be added to the vehicle and licensed via $3^{rd}$ party subscriptions—for example, a garage door opening company can use the API to provide remote (via vehicle) control of a garage door or door opener. A service orchestrator within the vehicle can provide access to subscribed-to software services for an owner and manage spin up and down of services based on available resources and subscriptions.

Physical and software controls 118 may allow for direct control of movable upfits, and mission handling software 119 can process a variety of API-configured command sets for various modules included with the vehicle 100 or in communication range of the vehicle.

The powerloader 120 may include one or more processors 123 in an onboard computing system 121. It may also include communications transceiver (e.g., Wi-Fi in this instance) 125 and both sensors 129 and control software 127. At the same time, the processors, sensors, and/or controls, for example, may be less capable than the corresponding elements in the vehicle 100. Further, at a site lacking Wi-Fi access points, the powerloader would lose remote-control capability (from an off-site location), but the vehicle 100 can act as a passthrough, receiving commands from the cloud 131 via the TCU and dispatching them to the powerloader via Wi-Fi.

The cloud 131 can include remote control terminals, as well as inventory management tracking 135 (for fleets, for example), dispatch orders 137, and mission tasks 139 with continual status updates.

Such an approach can also provide for assistance fleets, wherein a variety of upfit vehicles can be leverage on behalf of a multitude of jobs (and customers), building custom work missions and dispatching technology where needed on an as-available basis. A chassis that can be dynamically repurposed using services could allow for a vehicle to serve a city as, for example, a policy vehicle, a cherry picker or an ambulance. Different platforms may be loaded onto the chassis to serve different roles, but the functionality provided to, for example, lights, or a movable arm, or other varied features can be provided via wireless vehicle services, instead of having to rewire the vehicle to be compatible with each variant. While power supply and other non-wireless features may require some physical interface with the vehicle, control and usage of the variable upfits can be managed through software onboard the vehicle, allowing for utilization of a single vehicle as a multi-purpose vehicle, depending on the needs of the owner, the possession of the correct variable upfits, and any necessary subscriptions to software modules that manage the upfits.

Figure 2:
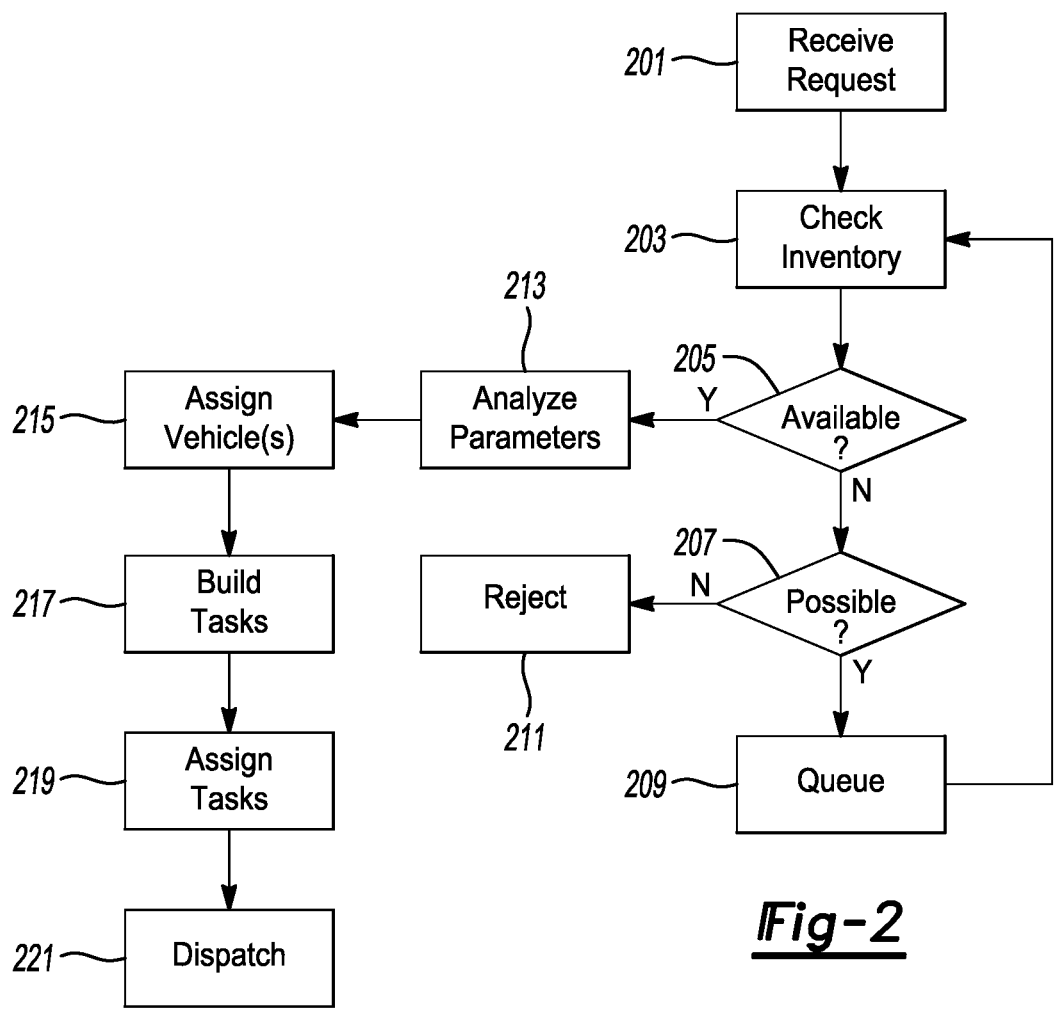
FIG. 2 shows an illustrative fleet and task dispatch process.

FIG. 2 shows an illustrative fleet and task dispatch process. In this example, the process receives a task request at 201. For illustrative purposes, a fleet including repurposable service vehicles is contemplated. Requests come in for container bin vehicle A, material truck B (where C also includes a container bin). Inventory checks at 203 can determined that Vehicle 1 can be loaded with a container bin and the SIM can be enabled with the functionality to control access and (if the bin is mobile) control over the container bin. At that moment in time, those are the functions needed by vehicle 1.

Once availability is confirmed at 205, the process can analyze the necessary parameters of the request (in this case, drive to site A, obtain materials for multiple bins within a container, deliver to sites B, C and D). Vehicle 1 can be assigned to the task at 215 (and temporarily removed from inventory) and the process can build the dispatch and delivery tasks at 217 and assign them to vehicle 1 at 219, which can then be dispatched at 221.

The vehicle can be enabled with the correct SLA for the SIM to enable completion of the tasks involved in the mission(s) assigned at 219. Each SIM can include full capabilities for all possible upfitters, locked and unlocked based on an assigned SLA, or the SIM can be upgraded based on a current SLA if the necessary capability is lacking. How this is handled is largely a business choice based on a monetization strategy—e.g., in another example a fleet owner can have an SLA defining max necessary capability for all fleet vehicles and those vehicles can be perpetually provided with corresponding upgrades and capabilities for onboard SIMS. Even in such an instance, though, an adaptive approach could be used, wherein an individual vehicle could be provided additional capability as necessary without having to retrofit a hardwired UIM.

Continuing the example for FIG. 2, a second request for the material truck B may occur and the system may determine that, while a vehicle 2 can be provided with both bin and material transport (powerloader) capability, the only bin is already out on vehicle 1, and so the capability is not currently available at 205, but it possible at 207 (resulting in request queueing at 209). Or, for example, the vehicle 2 could serve to partially fill the request and then later return and serve as the container bin truck and/or vehicle 1, if the prior job was completed, could fulfill the container bin portion of the mission for the second request.

Vehicle missions can be built using an API that is compatible with the SIM and, for example, a given upfit, which may have its own command set or parameters corresponding to its own functionality.

A fleet may also include one or more highly capable sensing vehicles that can be site-dispatched as needed in order to deliver on-demand sensing to enhance powerloader or other robotic movement functionality, among other things. This could include one or more autonomous vehicles that could more easily travel to sites as needed, essentially providing modular, mobile sensing technology that could integrate onsite with the existing upfits on site merely by arriving and engaging in authorized communication through the SIM provided in the vehicle.

Figure 3:
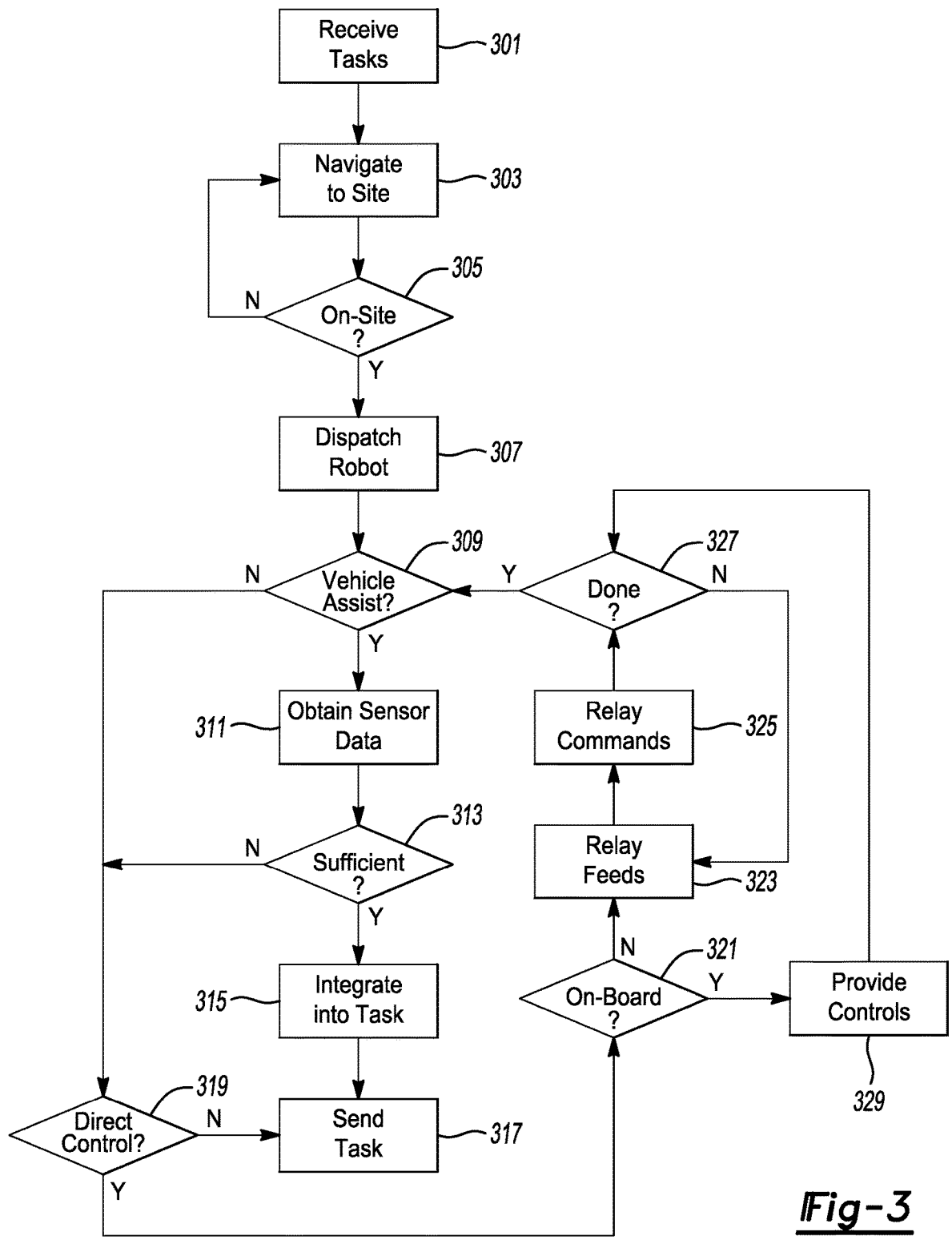
FIG. 3 shows and illustrative upfit utilization process.

FIG. 3 shows and illustrative upfit utilization process. In this example, a given vehicle 100 receives one or more tasks at 301, which in this example includes delivery and dispatch of a robotic assistance unit such as a powerloader to deliver a load across uneven construction terrain.

Once the vehicle is loaded with the powerloader, the first task assigned to the vehicle may be to navigate to the site at 303, which can either be autonomous or include a set of instructions for a human driver to execute.

Once the vehicle 100 is on-site, it can update the status of the mission and execute a next portion of the mission, which is the dispatch of the powerloader at 307 (or engagement of some other upfit as needed).

In this example, the powerloader may occasionally benefit from vehicle assistance at 309. Many upfit modules, as discussed, may benefit from leveraging vehicle technology, whether it be sensing, authentication, communication, etc. Requests for assistance can include navigation, communication, control, etc. Missions may specify an ongoing assistance strategy or an on-demand assistance strategy. Requests for assistance that cannot be handled by onsite capability provided by the present vehicle 100 may result in dispatch of a more-capable vehicle that can deliver the capabilities to the upfit on-site (i.e., by arriving and communicating using the SIM module and onboard capability).

In this example, if vehicle assistance is not needed at 309 (as determined by the vehicle, in this example, i.e., part of the task), the process may determine if direct control (steering, unlocking, loading, etc.) is desired at 319. The task may instruct the vehicle to assist the powerloader over uneven terrain, but the vehicle may not detect any terrain requiring assistance at 309. As will be discussed later, if the powerloader encounters terrain requiring assistance, a request can be dispatched to the vehicle.

If direct control is desired at 319, the process determines if the control will be onboard control at 321 or remote control. Onboard control can be provided though use of vehicle controls, a mobile device, etc. at 329, which can be run through the vehicle 100 communication system to convey the commands to the powerloader, if desired.

If remote control is desired, vehicle and/or powerloader camera and sensor feeds can be relayed to a remote site at 323 (to allow operator understanding of situational parameters) and commands received from a remote operator can be relayed to the powerloader at 325. The bi-directional feedback and conveyance of commands can continue as long as manual control is desired at 327.

If vehicle assistance is needed at 309, the vehicle can utilize sensors (or other systems) to provide the desired functionality at 311. In this instance, because the assistance relates to sensor data, the process determines if the data is sufficient to complete the task at 313. If the data is insufficient (e.g., the vehicle lacks adequate capability or the terrain is too complex), manual control is offered. Otherwise, the parameters (either data for robot self-navigation or navigation instructions, for example) are integrated into the task for the upfit unit at 315 and the task is sent to the unit 317 for execution.

Figure 4:
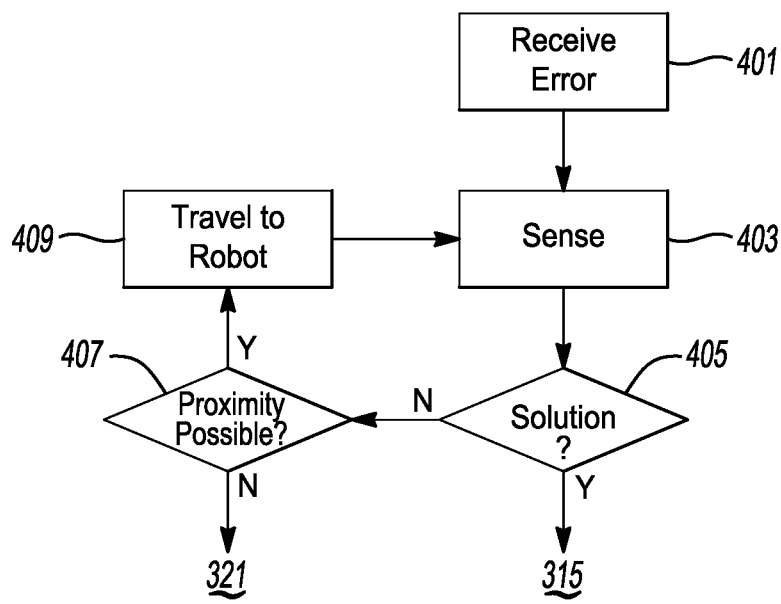
FIG. 4 shows an illustrative vehicular assistance process.

FIG. 4 shows an illustrative vehicular assistance process. In this example, on-demand assistance can be provided to a remote upfit unit. The vehicle or dispatch process receives an error at 401, which could alternatively be a request for assistance. For example, a vehicle onsite could receive a request from a unit outside of sensor range or a dispatch could receive a request from a remotely located unit requiring vehicle dispatch.

In this example, which relates to onsite guidance for a traveling robot, the vehicle engages sensors at 403 to determine if there is a pathing or data solution for the robot based on detected data at 405. This could, for example, include proximity sensing around the vehicle 100 if the vehicle is located proximate to the robot. Onboard navigation can devise a path for the robot or data can be conveyed directly. If there robot is further away, the vehicle determines if it can travel to the robot or not at 407. If there is no possible travel path, and because the robot cannot move without assistance in this example, inability to travel to the vehicle results in provision of onboard or remote (cloud based) control at 321. Otherwise, the vehicle travels to the robot's location at 409 and repeats the sensing.

In other instances, the request may come through the dispatch because there is no properly capable vehicle on-site. This can be an on-demand service provided by an alternative fleet of highly capable vehicles, or result in dispatch of a vehicle with specific capability to the need requested. For example, a container bin may require verification and unlocking services at a certain time, materials shipment bins may require short-term movement strategies to move around a site to a new location, etc. If these are limited time requests, it may make more fiscal sense to provide the necessary capabilities in a mobile solution (enhanced vehicle) as opposed to in every fleet vehicle, especially if the requests require capabilities that are not already native to the fleet vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a reconfigurable software integrated module providing upfitter support capabilities; and
    one or more vehicle processors configured to:
    receive control instructions for at least one upfitter module;
    determine whether native vehicle functions are required to supplement action by the upfitter module based on software, executing on the vehicle and designated for use with the upfitter module, indicating vehicle data to be provided to the upfitter module including at least receipt of a request from the upfitter module for vehicle assistance, the request identifying a result, of at least one of the native vehicle functions, usable by the upfitter module;
    utilize any determined native vehicle functions to provide capability to the upfitter module, including at least, responsive to the request, engagement of the at least one of the native vehicle functions; and
    relay the instructions and results from utilized native vehicle functions to the upfitter module for task completion, including at least provision of the identified result from the engaged at least one native vehicle functions identified by the request.

2. The system of claim 1, wherein the support capabilities include provision of vehicle sensor data to the upfitter module in a format readable by the upfitter module, determined based on configuration data included in the software integrated module.

3. The system of claim 1, wherein the support capabilities include provision of verification data to the upfitter module using a vehicle authentication process to authenticate data received from the upfitter module.

4. The system of claim 1, wherein the support capabilities include provision of verification data to the upfitter module using a vehicle authentication process to authenticate data received at the vehicle using a vehicle input on behalf of the upfitter module.

5. The system of claim 1, wherein the support capabilities include provision of communications data to the upfitter module using a vehicle native communication format for remote communication with a server and relaying server data to the upfitter module and upfitter feedback to the server with the vehicle acting as an intermediary.

6. The system of claim 1, wherein the at least one native vehicle function includes sensing and the result includes terrain mapping.

7. The system of claim 1, wherein the at least one native vehicle function includes authentication and the result includes verification of a credential input through the vehicle.

8. A method for a vehicle comprising a reconfigurable software integrated module providing upfitter support capabilities, the method comprising:
    receiving instructions for at least one upfitter module;
    determining whether native vehicle functions are required to supplement action by the upfitter module based on software, executing on the vehicle and designated for use with the upfitter module, indicating vehicle data to be provided to the upfitter module;
    utilizing any determined native vehicle functions to provide capability to the upfitter module;
    relaying the instructions and results from utilized native vehicle functions to the upfitter module for task completion; and
    providing verification data to the upfitter module using a vehicle authentication process to authenticate data received from the upfitter module.

9. The method of claim 8, wherein the support capabilities include provision of vehicle sensor data to the upfitter module in a format readable by the upfitter module, determined based on configuration data included in the software integrated module.

10. The method of claim 8, wherein the support capabilities include provision of verification data to the upfitter module using the vehicle authentication process to authenticate data received at the vehicle using a vehicle input on behalf of the upfitter module.

11. The method of claim 8, wherein the support capabilities include provision of communications data to the upfitter module using a vehicle native communication format for remote communication with a server and relaying server data to the upfitter module and upfitter feedback to the server with the vehicle acting as an intermediary.

12. The method of claim 8, further comprising:
    receiving a request from the upfitter for vehicle assistance, the request identifying a result, of a vehicle function, usable by the upfitter module; and
    responsive to the request, engaging the vehicle function and providing the identified result to the upfitter module.

13. The method of claim 12, wherein the vehicle function includes sensing and the result includes terrain mapping.

14. The method of claim 12, wherein the vehicle function includes authentication and the result includes verification of a credential input through the vehicle.

15. A vehicle comprising:
    a reconfigurable software integrated module providing upfitter support capabilities via software residing on the vehicle and designated for individual upfitter modules, the software integrated module working with a vehicle service orchestrator to manage upfitter services in accordance with vehicle resources;
    one or more vehicle processors configured to:
    receive indication of an attached upfit module;
    determine whether the vehicle includes software for control of the upfit module;
    verify subscription to the software;
    responsive to verification of subscription, provide vehicle services to the upfit module as requested by at least one of the software or the upfit module; and
    provide onboard wireless control of the upfit module via a vehicle interface.

16. The vehicle of claim 15, wherein the vehicle services include use of vehicle sensors on behalf of the upfit module, as requested by at least one of the software or the upfit module.

17. The vehicle of claim 15, wherein the vehicle services include use of vehicle navigation capability on behalf of the upfit module.

18. The vehicle of claim 15, wherein the one or more processors are further configured to offer a subscription to the software, responsive to no verification of subscription to the software.

\* \* \* \* \*